US008851667B1

(12) United States Patent
Chen

(10) Patent No.: US 8,851,667 B1
(45) Date of Patent: Oct. 7, 2014

(54) EYEGLASSES WITH TWO CONNECTION MEMBERS CONNECTED BETWEEN FRONT AND TEMPLES

(71) Applicant: Prohero Group Co., LTD., Tainan (TW)

(72) Inventor: Pen-Wei Chen, Tainan (TW)

(73) Assignee: Prohero Group., Ltd., Tainan (TW)

( * ) Notice: Subject to any disclaimer, the term of this patent is extended or adjusted under 35 U.S.C. 154(b) by 0 days.

(21) Appl. No.: 13/886,413

(22) Filed: May 3, 2013

(51) Int. Cl.
*G02C 1/08* (2006.01)
*G02C 5/20* (2006.01)

(52) U.S. Cl.
CPC .................................... *G02C 5/20* (2013.01)
USPC ............................................ 351/90; 351/116

(58) Field of Classification Search
USPC ................... 351/90, 93, 96, 95, 97, 116, 111
See application file for complete search history.

(56) References Cited

U.S. PATENT DOCUMENTS

| 5,500,694 A * | 3/1996 | Roever et al. .................. 351/97 |
| 2012/0092609 A1* | 4/2012 | Rothstein et al. ............... 351/95 |
| 2013/0114038 A1* | 5/2013 | Huang .......................... 351/116 |

* cited by examiner

*Primary Examiner* — Hung Dang
(74) *Attorney, Agent, or Firm* — Rosenberg, Klein & Lee

(57) ABSTRACT

A pair of eyeglasses includes a front having two rims for securing lens therein. Each rim has an opening at outside thereof and two protrusions extend from two ends of each opening. Two connection members are connected to the two rims. Each connection member has a slot and the two protrusions are secured in the slot corresponding thereto. Two temples are respectively and pivotably connected to the connection members.

3 Claims, 4 Drawing Sheets

US 8,851,667 B1

EYEGLASSES WITH TWO CONNECTION MEMBERS CONNECTED BETWEEN FRONT AND TEMPLES

BACKGROUND OF THE INVENTION

1. Fields of the Invention

The present invention relates to eyeglasses, and more particularly, to the eyeglasses with two connection members connected between the two temples and the front.

2. Descriptions of Related Art

The conventional eyeglasses are designed for reading purposes such as neat-sighted persons. Nevertheless, the modern eyeglasses have many different types and types which meet the latest fashion requirements and become an important fashion accessory. The eyeglasses can be used for reading, fashion, decoration and/or sport purposes, and people choose different types and colors of the eyeglasses to show their specific taste and characters.

The conventional eyeglasses are disclosed in FIG. 4 and comprises a front and two temples, wherein the front has two rims 5 with a bridge and nose pads connected therebetween. Each rim 5 has an open end through which a lens 51 is engaged with the rim 5. Two protrusions 52 respectively extend from two ends of the open end and each protrusion 52 has a locking hole 53 and a connection hole 54. A bolt extends through the locking hole 53 to fix the lens 51. the connection hole 54 is located corresponding to the temple 55. The bolt 53 is loosened due to frequent pivoting actions of the temple 55, once the bolt 53 is loosened, the lens 51 and/or the temple 55 are easily separated from the eyeglasses.

The present invention intends to provide two connection members which are connected between the two temples and the front so as to improve the shortcomings mentioned above.

SUMMARY OF THE INVENTION

The present invention relates to a pair of eyeglasses and comprises a front having two rims and each rim has an opening at an outside thereof. Two protrusions extend from two ends of each opening and each protrusion has a first hole and a second hole. The two protrusions are connected to each other by extending a bolt through the respective first holes of the two protrusions so as to secure a lens in the rim. Two connection members each have a slot. The two protrusions are engaged with the slot of the connection member corresponding thereto. A locking hole is defined in each of the two connection members. A bolt extends through the locking hole and the two second holes to secure the two protrusions in the slot. Each connection member is pivotably connected with a temple.

Preferably, the front and the connection members are made by the same material or different materials so as to have different styles.

The primary object of the present invention is to provide two connection members connected between the rims and the temples so as to have better connection between the rims and the lens.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
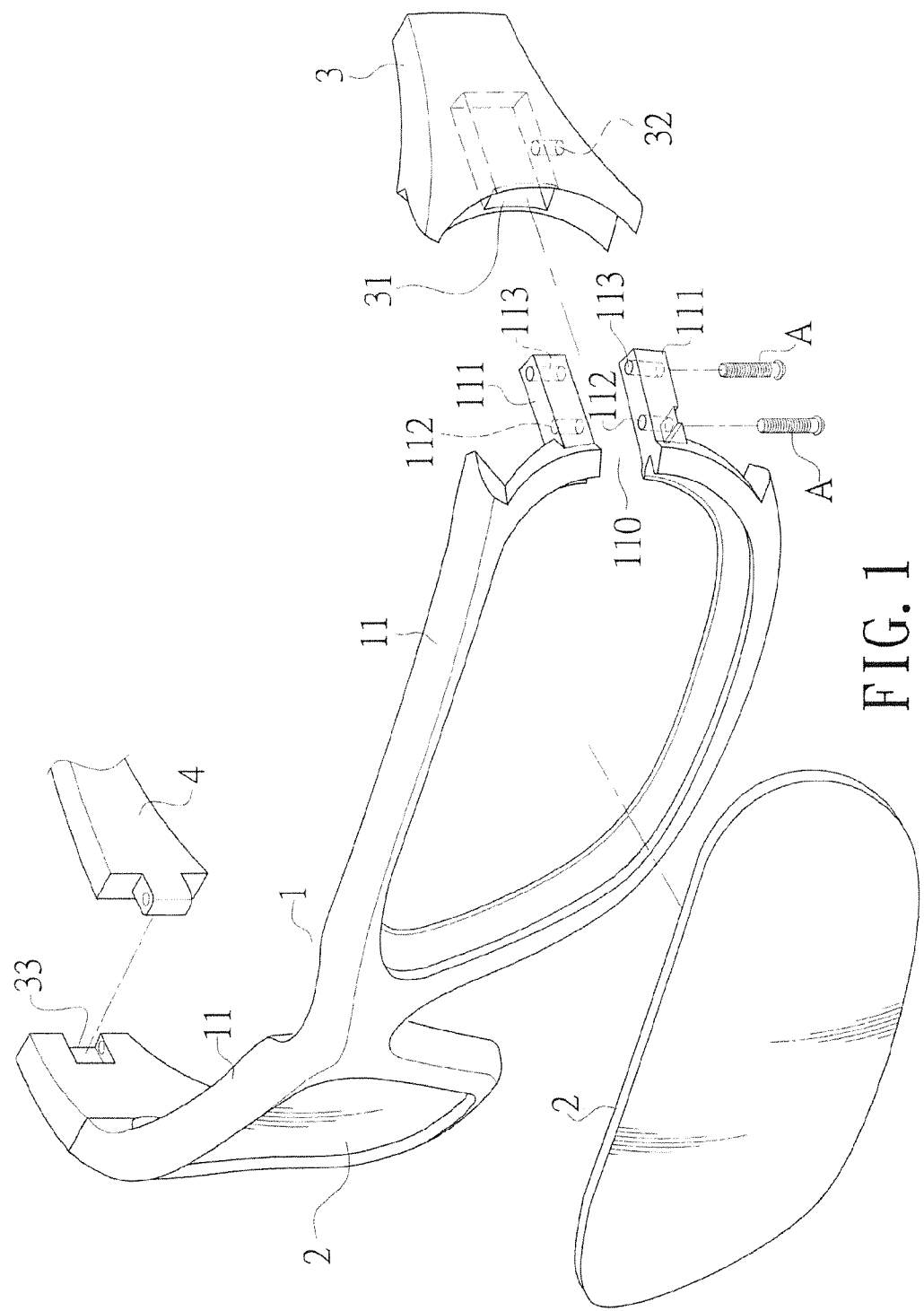
FIG. 1 is an exploded view to show the connection members and the front of the eyeglasses of the present invention, wherein the rims each have an opening.
Figure 2:
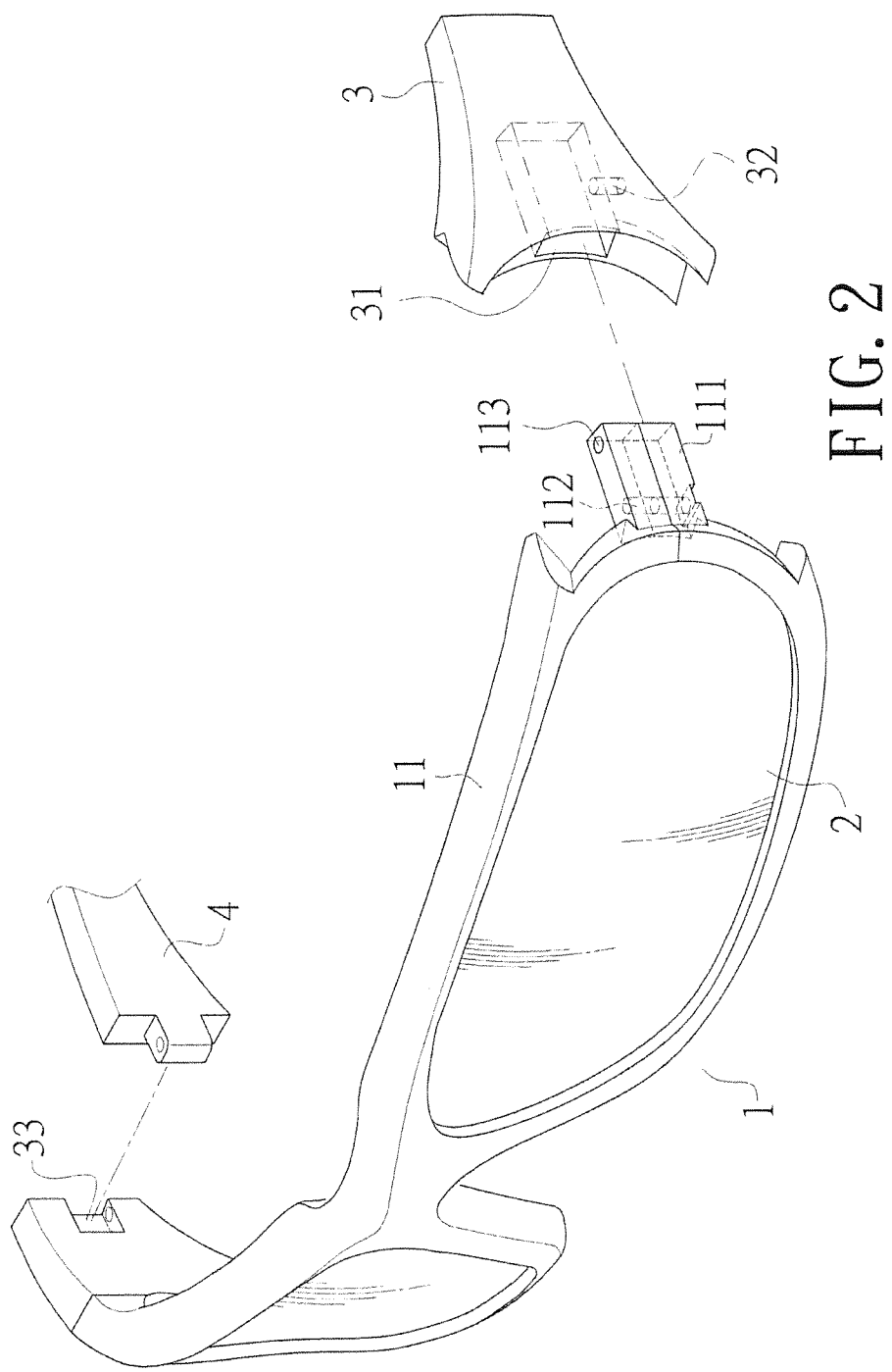
FIG. 2 is an exploded view to show the connection members and the front of the eyeglasses of the present invention, wherein the opening of each rim is closed.

Referring to FIGS. 1 and 2, the eyeglasses of the present invention comprise a front 1 having two rims 11 and each rim 11 has an opening 110 defined in outside thereof. Two protrusions 111 extend from two ends of each opening 110 and each protrusion 111 has a first hole 112 and a second hole 113. The two protrusions 111 are connected to each other by extending a bolt through the respective first holes 112 of the two protrusions 111 so as to secure a lens 2 in the rim 11. Two connection members 3 each have a slot 31, and the two protrusions 111 are engaged with the slot 31 of the connection member 3 corresponding thereto. A locking hole 32 is defined in each of the two connection members 3. A bolt "A" extends through the locking hole 32 and the two second holes 113 to secure the two protrusions 111 in the slot 31 to connect the connection member 3 to the front 1. Each connection member 3 is pivotably connected with a temple 4.

Figure 3:
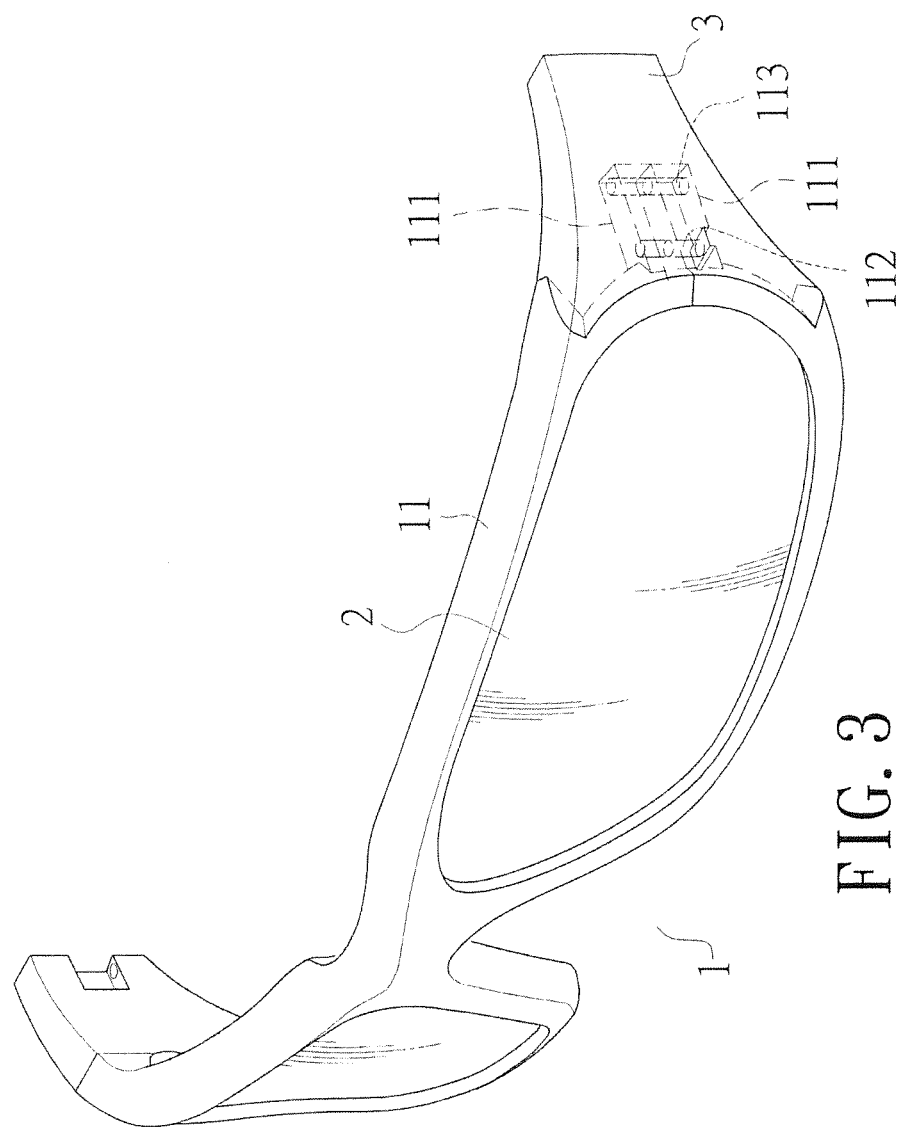
FIG. 3 shows that the connection members are connected to the two rims of the eyeglasses of the present invention.
Figure 4:
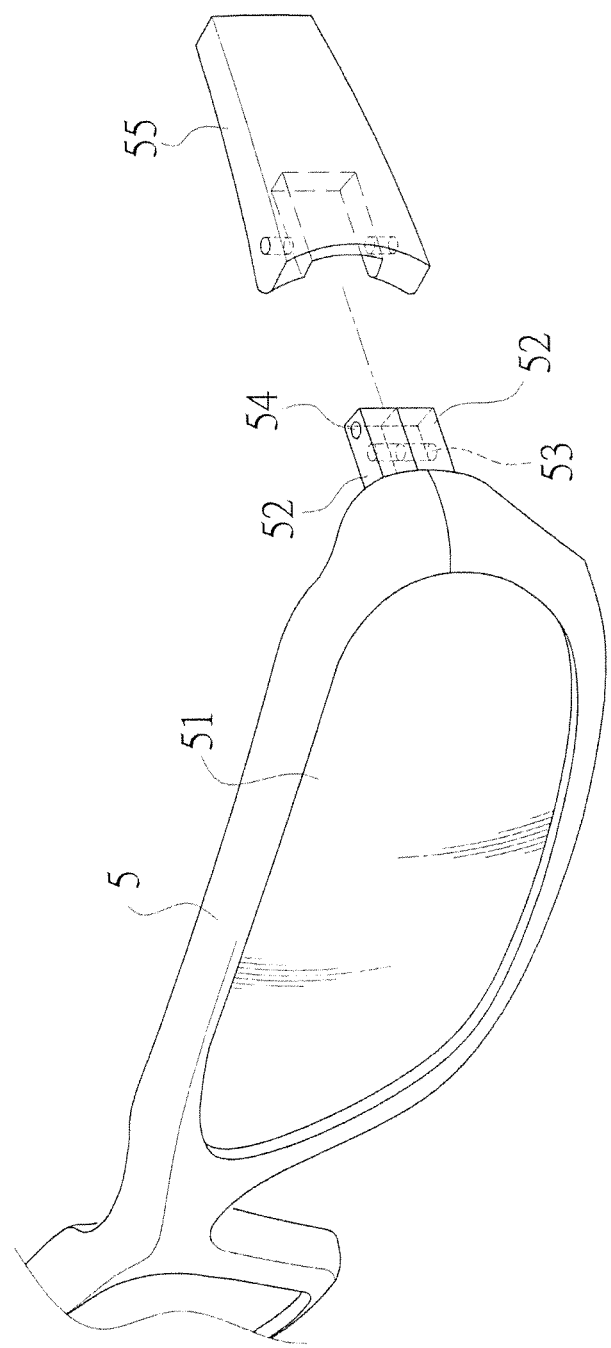
FIG. 4 shows the conventional eyeglasses.

As shown in FIGS. 1 to 3, when assembling, the lenses are engaged with the two rims 11 respectively via the two openings 110. A bolt "A" extends through the two first holes 112 of the two protrusions 111 to close the opening so that the lens 2 is secured in the rim 11. The two protrusions 111 are located in the slot 31 of the connection member 3 and another bolt "A" extends through the locking hole 32 and the two second holes 113 to secure the two protrusions 111 in the slot 31 to connect the connection member 3 to the front 1. Each connection member 3 is pivotably connected with a temple 4 at the recess 33 defined in the distal end of the connection member 3. The pivotal actions of the temples 4 are operated based on the connection members 3 instead of the rims 11 so that the lenses 2 in the rims 11 are not affected, and the two protrusions 111 are secured in the slot 31 so as to improve the shortcoming of the conventional eyeglasses.

The front 1 and the connection members 3 can be made by the same material or different materials (such as plastic and metal) to have different fashion features.

The connection members 3 and the rims 11 are connected to each other by two different locking areas so as to reinforce the connection therebetween.

The pivotal actions of the temples 4 are operated based on the connection members 3 so that the two protrusions 111 are not affected by the actions, therefore, the lenses 2 in the rims 11 are not affected.

While we have shown and described the embodiment in accordance with the present invention, it should be clear to those skilled in the art that further embodiments may be made without departing from the scope of the present invention.

What is claimed is:

1. A pair of eyeglasses comprising:

a front having two rims and each rim having an opening at an outside thereof, two protrusions extending from two ends of each opening, each protrusion having a first hole and a second hole, the two protrusions being connected to each other by extending a bolt through the respective first holes of the two protrusions so as to secure a lens in the rim, and two connection members each having a slot, the two protrusions being engaged with the slot of the connection member corresponding thereto, a locking hole defined in each of the two connection members, a bolt extending through the locking hole and the two second holes to secure the two protrusions in the slot, each connection member pivotably connected with a temple.

2. The eyeglasses as claimed in claim 1, wherein the front and the connection members are made by the same material.

3. The eyeglasses as claimed in claim 1, wherein the front and the connection members are made by different materials.

* * * * *